United States Patent [19]

Takahashi et al.

[11] 4,016,135
[45] * Apr. 5, 1977

[54] RADIOACTIVE RAY-RESISTANT STABILIZER

[75] Inventors: Masaaki Takahashi; Akira Ito, both of Tokyo; Shichiro Kawawata; Jiro Ogura, both of Hitachi, all of Japan

[73] Assignee: Kureha Kagaku Kogyo Kabushiki Kaisha, Tokyo, Japan

[*] Notice: The portion of the term of this patent subsequent to June 29, 1993, has been disclaimed.

[22] Filed: Dec. 27, 1974

[21] Appl. No.: 536,986

[30] Foreign Application Priority Data

Dec. 27, 1973 Japan .................................. 49-3642
Dec. 27, 1973 Japan .................................. 49-3643

[52] U.S. Cl. .......................... 260/45.7 R; 260/799
[51] Int. Cl.² .................................... C08K 5/01
[58] Field of Search ...................... 260/45.7 R, 799; 427/64, 157, 158; 252/301.3 R, 301.2 P

[56] References Cited

UNITED STATES PATENTS

| 3,062,771 | 11/1962 | Boenau et al. | 260/33.6 EP |
| 3,386,920 | 6/1968 | Alburger | 252/301.2 P |
| 3,567,647 | 3/1971 | Gerhardt | 252/301.3 R |

OTHER PUBLICATIONS

Paint, Oil & Chemical Review, Nov. 9, 1950 pp. 15 to 18 and 49.
Handbook of Chemistry and Physics, Chemical Rubber Pub. Co. pp. 996, 997, 1194 and 1195; 1959.
Kirk – Othmer Encyclopedia of Chemical Technology, vol. 19 (1967) pp. 654 to 682.

*Primary Examiner*—V. P. Hoke
*Attorney, Agent, or Firm*—Lane, Aitken, Dunner & Ziems

[57] ABSTRACT

A resin composition containing, as a radioactive ray-resistant stabilizer, an alkyl-substituted condensed tetracyclic hydrocarbon compound of the generic formula,

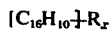

wherein R denotes an alkyl group having one to four carbon atoms and $x$ is an integer from 1 to 4, and when $x$ is an integer of 2 or more, R may be the same or different.

7 Claims, No Drawings

RADIOACTIVE RAY-RESISTANT STABILIZER

FIELD OF THE INVENTION

This invention relates to a novel radioactive rayresistant stabilizer. More particularly, this invention relates to a radioactive ray-resistant stabilizer which, upon being incorporated into a resin, gives rise to a resin composition possessing outstanding radioactive ray-resistant properties.

BACKGROUND OF THE INVENTION:

Generally, various items of equipment which are intended for installation around nuclear reactors, breeder reactors, ionizing radioactive ray generators, etc. are usually destined to be exposed to appreciably large doses of radioactive rays. The various resin compositions and adhesive agents to be used in insulating sheaths on electric cables, packings, sealing materials, frames, hose, etc. which are designed for use in the aforementioned equipment are, therefore, required to have high resistance to radioactive rays. As is universally known, however, various resins such as polyvinyl chloride, polyethylene, ethylene-propylene copolymer and epoxy resins which have heretofore been used in the various resin compositions and the adhesive agents generally offer quite low degrees of resistance to radioactive rays. The resin compositions and the adhesive agents which are made of such resins, therefore, suffer from a disadvantage that they are degraded after relatively short periods of service.

Under the circumstances described above, need has been felt for the provision of a radioactive ray-resistant stabilizer of a type capable of being incorporated in resins to provide resin compositions and adhesive agents having high resistance of radioactive rays.

SUMMARY OF THE INVENTION

An object of the present invention, therefore, is to provide a novel stabilizer resistant to radioactive rays, suitable for incorporation into resins.

Other objects of the present invention will become apparent from the following description of the invention.

It has now been discovered that an alkyl-substituted condensed tetracyclic hydrocarbon compound of the generic formula,

(wherein R denotes an alkyl group having one to four carbon atoms and $x$ is an integer from 1 to 4, and when $x$ is 2 or more, R may be the same or different), serves advantageously as a stabilizer for resistance to radioactive rays.

DETAILED DESCRIPTION OF THE INVENTION

The aforementioned alkyl-substituted condensed tetracyclic hydrocarbon compounds for use in the present invention are alkylfluoranthenes of the formula,

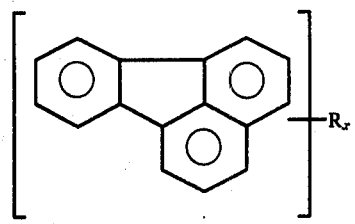

or alkylpyrenes of the formula,

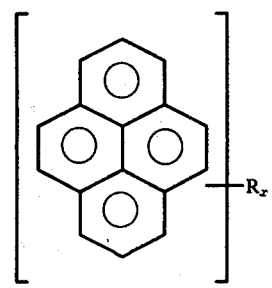

wherein, R denotes an alkyl group having one to four carbon atoms and $x$ is an integer from 1 to 4, and when $x$ is 2 or more, R may be the same or different. Further, the alkyl-substituted condensed tetracyclic hydrocarbon compounds may be mixtures containing both the alkylfluorenthenes and alkylpyrenes. From the above structural formulas, it is clear that the alkylfluoranthenes and alkylpyrenes all have at least one alkyl group selected from the class consisting of methyl, ethyl, propyl and butyl, attached at any one to four given positions in the fluoranthene nucleus or the pyrene nucleus. Such alkylfluoranthenes or such alkylpyrenes can easily be obtained by isolation from fractions such as coal tar and petroleum tar which abound in polycyclic aromatic hydrocarbons or by alkylating fluoranthene or pyrene with a lower olefin having up to four carbon atoms in the presence of a Friedel-Crafts type catalyst such as aluminum chloride or a solid acid catalyst such as silica-alumina. Alkylfluoranthenes generally have many isomers. For use in the present invention, a selected alkylfluoranthene need not always be a single isomeric form but may be in the form of a mixture of isomers. Alkylpyrenes also have many isomers. For the purpose of the present invention, however, a selected alkylpyrene, likewise, need not always be a pure isomer, but may be used in the form of a mixture of isomers.

With reference to the generic formulas given above, alkylfluoranthenes having five or more alkyl groups containing, respectively, one to four carbon atoms attached to the fluoranthene nucleus, or alkylpyrenes having five or more alkyl groups containing, respectively, one to four carbon atoms attached to the pyrene nucleus as well as alkylfluoranthenes having alkyl groups containing, respectively, five or more carbon atoms attached to the fluoranthene nucleus or alkylpyrenes having alkyl groups containing, respectively, five or more carbon atoms attached to the pyrene nucleus are difficult to synthesize. Even if such alkylfluoranthenes or alkylpyrenes, that fall outside the range specified for this invention, are prepared and mixed with resins, they fail to improve the radioactive ray-resisting property to the resultant resin compositions and, worse still, ready formation of voids in the compositions. When condensed tetracyclic hydrocarbons devoid of alkyl groups, namely fluoranthenes or pyrenes, are incorporated by themselves into resins, the resultant resin compositions show the phenomenon of bleeding, because fluoranthenes and pyrenes have notably inferior compatibility with resins. Thus, alkylfluoranthenes and alkylpyrenes falling outside the grouping specified for the present invention and unsubstituted fluoranthene and pyrene are not satisfactory when used alone as stabilizers for resistance to radioactive rays.

Specific examples of the alkylfluoranthenes suitable for the present invention include methylfluoranthene, dimethylfluoranthene, trimethylfluoranthene, ethylfluoranthene, diethylfluoranthene, triethylfluoranthene, propylfluoranthene, dipropylfluoranthene, tripropylfluoranthene, tetrapropylfluoranthene, butylfluoranthene, dibutylfluoranthene, tributylfluoranthene and tetrabutylfluoranthene. These alkylfluoranthenes are liquid at normal room temperature and have high boiling points of the order of about 350° to 520° C. Specific examples of the alkylpyrenes suitble for the present invention include methylpyrene, dimethylpyrene, trimethylpyrene, ethylpyrene, diethylpyrene, triethylpyrene, propylpyrene, dipropylpyrene, tripropylpyrene, tetrapropylpyrene, butylpyrene, dibutylpyrene and tributylpyrene. These alkylpyrenes are also liquid at normal room temperature and have high boiling points of the order of about 380 to 540° C. Since the alkylfluoranthenes and alkylpyrenes suitable for use in the present invention are liquid at normal room temperature, they are easily handled and blended into resins. Furthermore, because the specified stabilizers have such high boiling points as mentioned above, they are not readily released when resin compositions containing same are being molded or while molded articles made of the resin compositions are in use. In addition, alkylfluoranthenes and alkylpyrenes of the aforementioned description possess good compatibility with various resins and, therefore, permit a uniform and stable radioactive ray-resisting property to be conferred upon the resin compositions which are obtained by incorporation into resins.

The ratio in which an alkylfluoranthene or an alkylpyrene or a mixture thereof is mixed with a given resin is required to be such that the amount of the stabilizer is at least 1.0 part by weight per 100 parts by weight of the resin. If the amount is less than 1.0 part by weight per 100 parts by weight of the resin, then the stabilizer does not give an adequate radioactive ray-resistant property to the resin composition. The resins into which the stabilizers of the present invention can be effectively incorporated include polyvinyl chloride, vinyl chloride-vinyl acetate copolymer, vinyl chloride-vinylidene chloride copolymer, vinyl chloride-ethylene copolymer, polyethylene, polypropylene, polybutene, ethylene-vinyl acetate copolymer, ethylene-ethyl acrylate copolymer, ethylene-propylene copolymer, ethylene-propylene-diene copolymer, ethylene-vinyl acetate-grafted vinyl chloride copolymer, ethylene-ethyl acrylate-grafted vinyl chloride copolymer, ethylene-propylene-grafted vinyl chloride copolymer, chlorinated polyethylene, chlorinated polyethylene-grafted vinyl chloride copolymer, polyurethane, polyamide, polyester, acrylic resin, butyl rubber, chloroprene rubber, nitrile rubber, natural rubber, silicone rubber, chlorosulfonated polyethylene, styrenebutadiene rubber, styrene-butadiene-acrylonitrile copolymer, acrylonitrile-styrene copolymer, polyester-ether elastomer, polyvinyl acetate, polyacrylic acid ester, chloroprene copolymer, furfuryl alcoholic resin, polyvinyl butyral, polyvinyl formal, phenol resin, epoxy resin and melamine resin. The foregoing are illustrative and not limitative in any way.

When an alkylfluoranthene, an alkylpyrene or a mixture thereof to be used in the present invention, namely, the alkyl-substituted condensed tetracyclic hydrocarbon compound of this invention, is mixed with any of the resins described above, there can be obtained a resin composition possessed of outstanding radioactive ray-resisting property as is clear from the preferred embodiments cited herein below. Likewise, when a stabilizer of this invention is mixed into a grease, it serves the purpose of improving the radioactive ray-resisting property of the grease.

The present invention will be described more specifically below by reference to preferred embodiments, which should not be construed as limitative of the present invention. In the following description of the preferred embodiments, the term "kneading temperature" refers to the temperature at which the heating rolls were used in homogeneously kneading the ingredients of a composition and the term "press temperature" refers to the temperature at which the hot press was used in pressing the kneaded mass into the form of a sheet after the kneading work. In cases where cross-linking was required, the heating time for cross-linking is indicated next to the press temperature. The mixing ratio for the components in a given composition are all in parts by weight.

EXAMPLE 1

Alkyl-substituted condensed tetracyclic hydrocarbon compounds of the present invention were incorporated into various resins to produce stabilized resin compositions. By molding these resin compositions, sheets, No. 1 through No. 11 were obtained. For the purpose of comparison, comparative sheets A through E were prepared by molding resin compositions not containing the alkyl-substituted condensed tetracyclic hydrocarbon compounds of the present invention. The parts by weight of the various components, kneading temperature and press temperature of each of the sheets were as shown below. The heating time for cross-linking is also indicated in those cases involving required cross-linking. These sheets are compared in terms of radioactivity resistance capacity in Table 1. From Table 1, it will be seen that the sheets No. 1 through No. 11 containing the stabilizers of this invention possessed outstanding resistance to degradation by radioactivity.

SHEET 1

| | |
|---|---|
| Polyethylene | 100 |
| 4,4'-Thiobis (6-tert-butyl-3-methylphenol) | 0.1 |
| Monopropylfluoranthene | 5 |
| Kneading temperature | 120° C |
| Press temperature | 150° C |

SHEET 2

-continued

|  |  |  |
|---|---|---|
| | Polyethylene | 100 |
| | 4,4'-Thiobis (6-tert-butyl-3-methylphenol) | 0.2 |
| | Dicumyl peroxide | 2.5 |
| | Tripropylfluoranthene | 7 |
| | Kneading temperature | 120° C |
| | Press temperature | 180° C - 20 minutes |
| SHEET 3 | | |
| | Ethylene-propylene copolymer (Amount of propylene bound: 40% by weight) | 100 |
| | 2,2,4-Trimethyl-1,2-dihydroquinoline copolymer | 0.5 |
| | Dicumyl peroxide | 3.5 |
| | Sulfur | 0.1 |
| | Fired clay | 100 |
| | Monobutylfluoranthene | 10 |
| | Kneading temperature | 80° C |
| | Press temperature | 180° C - 20 minutes |
| SHEET 4 | | |
| | Polyvinyl chloride | 100 |
| | Diisodecyl phthalate | 45 |
| | Tribasic lead sulfate | 7 |
| | Lead stearate | 1 |
| | Fired clay | 20 |
| | Monomethylfluoranthene | 7 |
| | Kneading temperature | 160° C |
| | Press temperature | 170° C |
| SHEET 5 | | |
| | Chloroprene rubber | 100 |
| | Zinc white | 5 |
| | Magnesium oxide | 4 |
| | 2-Mercapto imidazoline | 1 |
| | Condensate of diphenylamine with acetone | 1 |
| | Process oil | 3 |
| | Hard clay | 40 |
| | Monoethylfluoranthene | 15 |
| | Kneading temperature | 70° C |
| | Press temperature | 160° C - 30 minutes |
| SHEET 6 | | |
| | Polyethylene | 100 |
| | 4,4'-Thiobis (6-tert-butyl-3-methylphenol) | 0.1 |
| | Monopropylpyrene | 5 |
| | Kneading temperature | 120° C |
| | Press temperature | 150°C |
| SHEET 7 | | |
| | Polyethylene | 100 |
| | 4,4'-Thiobis (6-tert-butyl-3-methylphenol) | 0.2 |
| | Dicumyl peroxide | 2.5 |
| | Trimethylpyrene | 7 |
| | Kneading temperature | 120° C |
| | Press temperature | 180° C - 20 minutes |
| SHEET 8 | | |
| | Ethylene-propylene copolymer (Amount of propylene bound: 40% by weight) | 100 |
| | 2,2,4-Trimethyl-1,2-dihydroquinoline copolymer | 0.5 |
| | Dicumyl peroxide | 3.5 |
| | Sulfur | 0.1 |
| | Fired clay | 100 |
| | Diethylpyrene | 10 |
| | Kneading temperature | 80° C |
| | Press temperature | 180° C - 20 minutes |
| SHEET 9 | | |
| | Polyvinyl chloride | 100 |
| | Diisodecyl phthalate | 45 |
| | Tribasic lead sulfate | 7 |
| | Lead stearate | 1 |
| | Fired clay | 20 |
| | Monomethylpyrene | 7 |
| | Kneading temperature | 160° C |
| | Press temperature | 170° C |
| SHEET 10 | | |
| | Chloroprene rubber | 100 |
| | Zinc white | 5 |
| | Magnesium oxide | 4 |
| | 2-Mercapto imidazoline | 1 |
| | Condensate of diphenylamine with acetone | 1 |
| | Process oil | 3 |
| | Hard clay | 40 |
| | Tripropylpyrene | 15 |
| | Kneading temperature | 70° C |
| | Press temperature | 160° C - 30 minutes |
| SHEET 11 | | |
| | Polyethylene | 100 |
| | 4,4'-Thiobis (6-tert-butyl-3-methylphenol) | 0.1 |
| | Mixture of monopropylfluoranthene (50% by weight) and monopropylpyrene (50% by weight) | 5 |
| | Kneading temperature | 120° C |
| | Press temperature | 150° C |
| Comparative Sheet A | | |
| | Polyethylene | 100 |
| | 4,4'-Thiobis (6-tert-butyl-3-methylphenol) | 0.1 |
| | Kneading temperature | 120° C |
| | Press temperature | 150° C |

-continued

| | |
|---|---|
| Comparative Sheet B | |
| Polyethylene | 100 |
| 4,4'-Thiobis (6-tert-butyl-3-methylphenol) | 0.2 |
| Dicumyl peroxide | 2.5 |
| Kneading temperature | 120° C |
| Press temperature | 180° C - 20 minutes |
| Comparative Sheet C | |
| Ethylene-propylene copolymer (Amount of propylene bound: 40% by weight) | 100 |
| 2,2,4-Trimethyl-1,2-dihydroquinoline copolymer | 0.5 |
| Dicumyl peroxide | 3.5 |
| Sulfur | 0.1 |
| Fired clay | 100 |
| Kneading temperature | 80° C |
| Press temperature | 180° C - 20 minutes |
| Comparative Sheet D | |
| Polyvinyl chloride | 100 |
| Diisodecyl phthalate | 45 |
| Tribasic lead sulfate | 7 |
| Lead stearate | 1 |
| Fired clay | 20 |
| Kneading temperature | 160° C |
| Press temperature | 170° C |
| Comparative Sheet E | |
| Chloroprene rubber | 100 |
| Zinc white | 5 |
| Magnesium oxide | 4 |
| 2-Mercapto imidazoline | 1 |
| Condensate of diphenylamine with acetone | 1 |
| Process oil | 3 |
| Hard clay | 40 |
| Kneading temperature | 70° C |
| Press temperature | 160° C - 30 minutes |

TABLE 1 (1)

| | | Sheet 1 | Sheet 2 | Sheet 3 | Sheet 4 | Sheet 5 | Sheet 6 | Sheet 7 | Sheet 8 | Sheet 9 | Sheet 10 | Sheet 11 |
|---|---|---|---|---|---|---|---|---|---|---|---|---|
| Tensile strength (in kg/cm$^2$) | Before irradiation | 1.85 | 2.32 | 0.60 | 2.15 | 1.78 | 1.82 | 2.30 | 0.62 | 2.13 | 1.72 | 1.84 |
| | After irradiation | 1.88 | 2.45 | 0.65 | 2.10 | 1.95 | 1.85 | 2.40 | 0.69 | 2.08 | 1.93 | 1.86 |
| Elongation % | Before irradiation | 670 | 580 | 700 | 320 | 730 | 650 | 580 | 690 | 310 | 710 | 670 |
| | After irradiation | 450 | 520 | 550 | 310 | 380 | 460 | 530 | 560 | 300 | 390 | 450 |

TABLE 1 (2)

| | | Comparative Sheet A | Comparative Sheet B | Comparative Sheet C | Comparative Sheet D | Comparative Sheet E |
|---|---|---|---|---|---|---|
| Tensile strength (in kg/cm$^2$) | Before irradiation | 1.89 | 2.65 | 0.65 | 2.32 | 1.80 |
| | After irradiation | 1.90 | 2.70 | 0.40 | 1.90 | 1.01 |
| Elongation (%) | Before irradiation | 650 | 540 | 680 | 310 | 700 |
| | After irradiation | 150 | 220 | 120 | 180 | 70 |

(Note)
The values given in the table are those of the indicated properties before and after irradiation with 100 mega rads of gamma rays to which the sheets were exposed.

EXAMPLE 2

Alkyl-substituted condensed tetracyclic stabilizers of the present invention were incorporated in various resins to produce stabilized resin compositions. Coated electric cables No. 1 through No. 5 were produced by coating electric cables with the resultant resin compositions as described, below. For the purpose of comparison, comparative coated electric cables A through D were produced as described below by coating electric cables with resin compositions not containing the stabilizers of the present invention.

These coated electric cables are compared in terms of radioactivity resistance in Table 2.

Coated electric cable 1

One hundred (100) parts by weight of polyethylene, 0.1 part by weight of 4,4'-thiobis (6-tert-butyl-3-methylphenol) and 5 parts by weight of trimethylfluoranthene were uniformly kneaded with hot rolls at 140° C. The resultant blend was extruded to a thickness of 1.5 mm at 170° C on the surface of a stranded conductor having a cross-sectional area of 2 mm$^2$ to produce an insulated electric cable.

Coated electric cable 2

One hundred (100) parts by weight of polyethylene, 0.1 part by weight of 4,4'-thiobis (6-tert-butyl-3-methylphenol), 2.5 parts by weight of dicumyl peroxide and 4 parts by weight of dipropylfluoranthene were uniformly kneaded with hot rolls at 120° C. Then, the resultant blend was extruded at 135° C on the surface of a stranded conductor and subsequently heated in a heating furnace at 200° C for five minutes to produce an insulated electric cable having the same size as that of coated electric cable 1 (the same applies to the coated electric cables described hereinafter).

Coated electric cable 3

One hundred (100) parts by weight of polyvinyl chloride, 45 parts by weight of diisodecyl phthalate, 5 parts by weight of tribasic lead sulfate, 1 part by weight of epoxylated soybean oil, 1 part by weight of lead stearate, 30 parts by weight of fired clay and 7 parts by weight of monobutylpyrene were kneaded with hot rolls at 160° C. The resultant blend was extruded at 180° C on the surface of a stranded conductor to produce a coated electric cable.

Coated electric cable 4

One hundred (100) parts by weight of ethylenepropylene rubber (amount of ethylene bound: 60% by weight), 0.5 part by weight of 2,2,4-trimethyl-1,2-dihydroquinoline polymer, 3.5 parts by weight of dicumyl peroxide, 0.1 part by weight of sulfur, 100 parts by weight of fired clay and 10 parts by weight of dipropylpyrene were uniformly kneaded with hot rolls at 110° C.

Then the resultant blend was extruded at 110° C on the surface of a stranded conductor and subsequently heated in a heating furnace at 180° C for 10 minutes to produce an insulated electric cable.

Coated electric cable 5

One hundred (100) parts by weight of polyethylene, 0.1 part by weight of 4,4'-thiobis (6-tert-butyl-3-methylphenol) and 5 parts by weight of a mixture consisting of trimethylfluoranthene (50% by weight) and monobutylpyrene (50% by weight) were uniformly kneaded with hot rolls at 140° C. Then, the resultant blend was extruded at 170° C on the surface of a stranded conductor having a cross-sectional area of 2 mm$^2$ to produce an insulated electric cable.

Comparative coated electric cable A

An insulated electric cable was obtained by following the procedure employed in the production of the coated electric cable 1, except that the trimethylfluoranthene was omitted from the blend.

Comparative coated electric cable B

An insulated electric cable was produced by following the procedure used in the production of the coated electric cable 2, except that the dipropylfluoranthene was omitted from the blend.

Comparative coated electric cable C

An insulated electric cable was produced by following the procedure used in the production of the coated electric cable 3, except that the monobutylpyrene was omitted from the blend.

Comparative coated electric cable D

An insulated electric cable was produced by following the procedure used in the production of the coated electric cable 4, except that the dipropylpyrene was omitted from the blend.

TABLE 2 (1)

| | | Coated electric cable 1 | Coated electric cable 2 | Coated electric cable 3 | Coated electric cable 4 | Coated electric cable 5 |
|---|---|---|---|---|---|---|
| Tensile strength (in kg/cm$^2$) | Before irradiation | 31.5 | 38.4 | 29.4 | 13.0 | 30.5 |
| | After irradiation | 30.0 | 35.7 | 28.5 | 12.1 | 29.4 |
| Elongation (%) | Before irradiation | 550 | 470 | 280 | 470 | 540 |
| | After irradiation | 300 | 400 | 200 | 280 | 300 |
| Dielectric breakdown strength (KV) | Before irradiation | 85 | 80 | 65 | 75 | 85 |
| | After irradiation | 85 | 75 | 60 | 70 | 85 |
| Winding property | Before irradiation | No abnormality | No abnormality | No abnormality | No abnormality | No abnormality |
| | After irradiation | No abnormality | No abnormality | No abnormality | No abnormality | No abnormality |

TABLE 2 (2)

| | | Comparative coated electric cable A | Comparative coated electric cable B | Comparative coated electric cable C | Comparative coated electric cable D |
|---|---|---|---|---|---|
| Tensile strength (in kg/cm$^2$) | Before irradiation | 31.4 | 37.6 | 29.7 | 13.8 |
| | After irradiation | 27.0 | 33.0 | 27.0 | 10.3 |
| Elongation (%) | Before irradiation | 520 | 420 | 270 | 460 |
| | After irradiation | 50 | 40 | 40 | 70 |
| Dielectric breakdown strength (KV) | Before irradiation | 70 | 85 | 60 | 65 |
| | After irradiation | 55 | 65 | 45 | 50 |
| Winding property | Before irradiation | No abnormality | No abnormality | No abnormality | No abnormality |
| | After irradiation | Cracks formed | Cracks formed | Cracks formed | Cracks formed |

(Note)

1. The values given in the table are those of the indicated properties before and after irradiation with 100 mega rads of gamma rays to which the coated electric cables were exposed.

2. The tensile strength represents the magnitude of tensile force at which the sheath obtained by extracting the electric conductor, reached the point of breakage under gradually increased stretching.

3. The elongation represents the extent of protraction at which the sheath reached the point of breakage under gradually increased stretching in (2) above.

4. The dielectric breakdown strength represents the magnitude of dielectric breakdown observed in the test conducted by applying AC voltage to the coated electric cables at a stepwise voltage increase rate of 500 V/sec.

5. The winding property reflects the fastness of the adhesive bond between the resin composition and the electric conductor and was rated in terms of the condition of the insulating coat when the test piece was wound around a mandrel having a diameter twice as large as that of the test piece.

EXAMPLE 3

By a procedure described herein below, cable sheaths of resin compositions were extruded around the surface of an electric conductor. The cable sheaths thus produced were tested for resistance to radioactivity. The results were as shown in Table 3.

The cable sheaths No. 1 through No. 6 were produced by using resin compositions incorporating alkyl-substituted condensed tetracyclic stabilizers of the present invention. The comparative cable sheaths A and B were produced by using resin compositions omitting the stabilizers of the present invention.

Cable sheath 1

First, a polyethylene blend consisting of 100 parts by weight of polyethylene and 0.1 part by weight of 4,4'-thiobis(6-tert-butyl-3-methylphenol) was extruded to a thickness of 1.2 mm around the surface of a stranded electric conductor having a cross-sectional area of 2 mm². Then three cable cores, coated with the polyethylene blend, were stranded with jute fiber interposed between the strands. The resultant stranded electric cable was coated with a cable sheath formed by extruding a resin composition comprising the following components by an ordinary method to a thickness of 1.5 mm around the circumference thereof.

| | |
|---|---|
| Polyvinyl chloride | 100 parts by weight |
| Diisodecyl phthalate | 45 parts by weight |
| Tribasic lead sulfate | 5 parts by weight |
| Lead stearate | 1 part by weight |
| Epoxylated soybean oil | 1 part by weight |
| Fired clay | 30 parts by weight |
| Monomethylfluoranthene | 7 parts by weight |

Cable sheath 2

By following the procedure for Cable Sheath 1, three cable cores coated with the polyethylene blend were stranded with jute fiber interposed between the strands. The resultant stranded electric cable was coated with a cable sheath formed by extruding a resin composition comprising the following components by an ordinary method to a thickness of 1.5 mm around the surface thereof.

| | |
|---|---|
| Polyvinyl chloride | 100 parts by weight |
| Diisodecyl phthalate | 45 parts by weight |
| Tribasic lead sulfate | 5 parts by weight |
| Lead stearate | 1 part by weight |
| Epoxylated soybean oil | 1 part by weight |
| Fired clay | 30 parts by weight |
| Trimethylfluoranthene | 7 parts by weight |

Cable sheath 3

By following the procedure for Cable Sheath 1, three cable cores coated with the polyethylene blend were stranded with jute fiber interposed between the strands. Then, the resultant stranded electric cable was coated with a cable sheath formed by extruding a resin composition comprising the following components by an ordinary method to a thickness of 1.5 mm around the surface thereof.

| | |
|---|---|
| Polyvinyl chloride | 100 parts by weight |
| Diisodecyl phthalate | 45 parts by weight |
| Tribasic lead sulfate | 5 parts by weight |
| Lead stearate | 1 part by weight |
| Epoxylated soybean oil | 1 part by weight |
| Fired clay | 30 parts by weight |
| Monoethylfluoranthene | 10 parts by weight |

Cable sheath 4

First, a blend consisting of 100 parts by weight of ethylenepropylene copolymer having 60% by weight of ethylene bound thereto, 0.5 part by weight of 2,2,4-trimethyl-1,2-dihydroxy-quinoline polymer, 3.5 parts by weight of dicumyl peroxide, 0.1 part by weight of sulfur and 100 parts by weight of fired clay was extruded to a thickness of 1.2 mm around the surface of a stranded electric conductor having a crosssectional area of 2 mm², then heated for cross-linking. Then, three cable cores, coated with the blend mentioned above, were stranded with jute fiber interposed between the strands. The resultant stranded electric cable was coated with a cable sheath formed by extruding a resin composition comprising the following components by an ordinary method to a thickness of 1.5 mm around the surface thereof and heating the extruded resin composition for crosslinking.

| | |
|---|---|
| Chloroprene rubber | 100 parts by weight |
| Zinc white | 5 parts by weight |
| Magnesium oxide | 4 parts by weight |
| 2-Mercapto imidazoline | 1 part by weight |
| Condensate of diphenylamine and acetone | 1 part by weight |
| Process oil | 3 parts by weight |
| Hard clay | 40 parts by weight |
| Diethylpyrene | 10 parts by weight |

Cable sheath 5

By following the procedure for Cable Sheath 4, three cable cores coated with the blend were stranded with jute fiber interposed between the strands. The resultant stranded electric cable was coated with a cable sheath formed by extruding a resin composition comprising the following components by an ordinary method to a thickness of 1.5 mm around the surface thereof and heating the extruded resin composition for cross-linking.

| | |
|---|---|
| Chloroprene rubber | 100 parts by weight |
| Zinc white | 5 parts by weight |
| Magnesium oxide | 4 parts by weight |
| 2-Mercapto imidazoline | 1 part by weight |
| Condensate of diphenylamine and acetone | 1 part by weight |
| Process oil | 3 parts by weight |
| Hard clay | 40 parts by weight |
| Tripropylpyrene | 12 parts by weight |

Cable sheath 6

By following the procedure for Cable Sheath 4, three cable cores coated with the blend were stranded with jute fiber interposed between the strands. The resultant stranded electric cable was coated with a cable sheath formed by extruding a resin composition comprising the following components by an ordinary method to a thickness of 1.5 mm around the surface thereof and heating the extruded resin composition for cross-linking.

| | |
|---|---|
| Chloroprene rubber | 100 parts by weight |
| Zinc white | 5 parts by weight |
| Magnesium oxide | 4 parts by weight |
| 2-Mercapto imidazoline | 1 part by weight |
| Condensate of diphenylamine and acetone | 1 part by weight |
| Process oil | 3 parts by weight |
| Hard clay | 40 parts by weight |
| Monoethylpyrene | 10 parts by weight |

Comparative cable sheath A

By following the procedure for Cable Sheath 1, three cable cores obtained in the state coated with the polyethylene blend were stranded with jute fiber interposed between the strands. The resultant stranded electric cable was coated with a cable sheath formed by extruding a resin composition comprising the following components by an ordinary method to a thickness of 1.5 mm around the circumference.

| | |
|---|---|
| Polyvinyl chloride | 100 parts by weight |
| Diisodecyl phthalate | 45 parts by weight |
| Tribasic lead sulfate | 5 parts by weight |
| Lead stearate | 1 part by weight |
| Epoxylated soybean oil | 1 part by weight |
| Fired clay | 30 parts by weight |

Comparative cable sheath B

By following the procedure for Cable Sheath 4, three cable cores coated with the blend were stranded with jute fiber interposed between the strands. The resultant stranded electric cable was coated with a cable sheath formed by extruding a resin composition by an ordinary method to a thickness of 1.5 mm around the surface thereof and heating the extruded resin composition for cross-linking.

| | |
|---|---|
| Chroloprene rubber | 100 parts by weight |
| Zinc white | 5 parts by weight |
| Magnesium oxide | 4 parts by weight |
| 2-Mercapto imidazoline | 1 part by weight |
| Condensate of diphenylamine and acetone | 1 part by weight |
| Process oil | 3 parts by weight |
| Hard clay | 40 parts by weight |

2. The values of tensile strength and elongation given in the table were those obtained from sample cable sheath pieces cut off the cables before and after irradiation. The sample cable sheath pieces taken from the sides of cables after irradiation were invariably taken on the sides of cables exposed to the irradiation source.

3. The winding property was rated with respect to the state of cable wound on a mandrel having a diameter twice as large as that of the cable, with the cable wound in such a manner that the side of cable exposed to the irradiation source fell outside.

EXAMPLE 4

Adhesive agents No. 1 through No. 6 were prepared by mixing various resins with the stabilizers of the present invention at varying mixing ratios indicated, respectively, below. For the purpose of comparison, comparative adhesive agents A through F were prepared by mixing the indicated components at varying mixing ratios by an ordinary method, except that the stabilizers of the present invention were omitted.

The adhesive agents were tested for resistance to radioactivity. The results were as shown in Table 4.

Adhesive agent 1
| | |
|---|---|
| Epoxy resin (epoxy equivalent 180 – 200) | 100 parts by weight |
| Liquid polyamide resin (amine value 210 – 230) | 100 parts by weight |
| Powdered alumina | 50 parts by weight |
| Mixture of monoethylfluoranthene with diethylfluoranthene | 30 parts by weight |

Adhesive agent 2
| | |
|---|---|
| Furfuryl alcohol type resin | 100 parts by weight |
| Stone powder | 300 parts by weight |
| Phthalic anhydride | 10 parts by weight |
| Dipropylfluoranthene | 20 parts by weight |

Adhesive agent 3
| | |
|---|---|
| Polyester obtained by condensing maleic anhydride with glycol | 100 parts by weight |
| Benzoyl peroxide | 2 parts by weight |
| Cobalt naphthenate | 2 parts by weight |
| Fired clay | 50 parts by weight |
| Monoethylfluoranthene | 5 parts by weight |

Adhesive agent 4
| | |
|---|---|
| Polyvinyl butyral resin | 100 parts by weight |
| Equal volume mixture of methanol and benzene | 400 parts by weight |
| Tributylpyrene | 10 parts by weight |

Adhesive agent 5
| | |
|---|---|
| Polyvinyl formal resin | 100 parts by weight |
| Equal volume mixture of methanol and benzine | 400 parts by weight |
| Diethylpyrene | 5 parts by weight |

Adhesive agent 6

TABLE 3

| | | Cable sheath 1 | Cable sheath 2 | Cable sheath 3 | Cable sheath 4 | Cable sheath 5 | Cable sheath 6 | Comparative cable sheath A | Comparative cable sheath B |
|---|---|---|---|---|---|---|---|---|---|
| Tensile strength (in kg/cm$^2$) | Before irradiation | 1.80 | 1.85 | 1.90 | 1.63 | 1.78 | 1.77 | 1.90 | 1.71 |
| | After irradiation | 1.60 | 1.70 | 1.85 | 1.41 | 1.43 | 1.51 | 1.25 | 0.41 |
| Elongation (%) | Before irradiation | 300 | 310 | 290 | 370 | 400 | 390 | 290 | 400 |
| | After irradiation | 120 | 110 | 150 | 190 | 210 | 280 | 20 | 15 |
| Winding property after irradiation | | No abnormality | No abnormality | No abnormality | No abnormality | No abnormality | No abnormality | Cracks formed in sheath | Cracks formed in sheath |

(Note)

1. The dose of irradiation to which the cable sheaths were exposed was 500 mega rads of gamma rays.

| | |
|---|---|
| Nitrile rubber (amount of nitrile bound 32%, Mooney value 70) | 100 parts by weight |
| Carbon black | 40 parts by weight |
| Methylethyl ketone | 200 parts by weight |
| Toluene | 120 parts by weight |
| Isopropyl alcohol | 10 parts by weight |
| Dibutylpyrene | 5 parts by weight |

-continued

| Comparative adhesive agent A | |
|---|---|
| Epoxy resin (epoxy equivalent 180 – 200) | 100 parts by weight |
| Liquid polyamide resin (amine value 210 – 230) | 100 parts by weight |
| Powdered alumina | 50 parts by weight |
| Comparative adhesive agent B | |
| Furfuryl alcoholic resin | 100 parts by weight |
| Stone powder | 300 parts by weight |
| Phthalic anhydride | 10 parts by weight |
| Comparative adhesive agent C | |
| Polyester obtained by condensing maleic anhydride and glycol | 100 parts by weight |
| Benzoyl peroxide | 2 parts by weight |
| Cobalt naphthenate | 2 parts by weight |
| Fired clay | 50 parts by weight |
| Comparative adhesive agent D | |
| Polyvinyl butyral resin | 100 parts by weight |
| Equal volume mixture of methanol with benzene | 400 parts by weight |
| Comparative adhesive agent E | |
| Polyvinyl formal resin | 100 parts by weight |
| Equal volume mixture of methanol with benzene | 400 parts by weight |
| Comparative adhesive agent F | |
| Nitrile rubber (amount of nitrile bound 32&, Mooney value 70) | 100 parts by weight |
| Carbon black | 40 parts by weight |
| Methylethyl ketone | 200 parts by weight |
| Toluene | 120 parts by weight |
| Isopropyl alcohol | 10 parts by weight |

TABLE 4

| Shear strength (kg/cm$^2$) | Adhesive agent 1 | Adhesive agent 2 | Adhesive agent 3 | Adhesive agent 4 | Adhesive agent 5 | Adhesive agent 6 |
|---|---|---|---|---|---|---|
| Before irradiation | 220 | 38 | 105 | 90 | 105 | 25 |
| After irradiation | 170 | 27 | 81 | 60 | 65 | 13 |

| Shear strength (kg/cm$^2$) | Comparative adhesive agent A | Comparative adhesive agent B | Comparative adhesive agent C | Comparative adhesive agent D | Comparative adhesive agent E | Comparative adhesive agent F |
|---|---|---|---|---|---|---|
| Before irradiation | 240 | 40 | 110 | 120 | 120 | 20 |
| After irradiation | 80 | 18 | 35 | 45 | 42 | 6 |

Note:
(1) The shear strength was tested with respect to a given agent placed for adhesion between two steel sheets.
(2) The source of irradiation was gamma rays from cobalt 60 and the dose was 100 mega rads.

What is claimed is:

1. A composition consisting essentially of a polymeric resin and, as a stabilizer against radioactivity, an alkyl-substituted condensed tetracyclic compound of the generic formula:

wherein, R denotes an alkyl group having one to four carbon atoms and x is an integer from 1 to 4, and when x is 2 or more, R may be the same or different.

2. The composition of claim 1, wherein said stabilizer is at least one compound selected from the group consisting of alkylfluoranthenes of the formula,

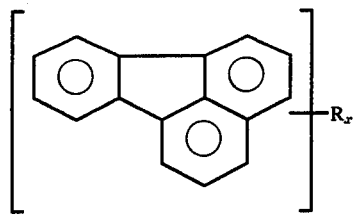

and alkylpyrenes of the formula,

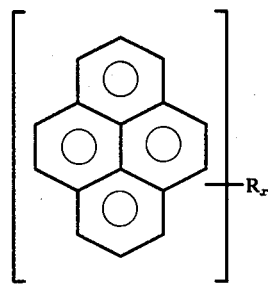

wherein, R denotes an alkyl group having one to four carbon atoms an x is an integer from 1 to 4, and when x is 2 or more, R may be the same or different.

3. The composition of claim 2, wherein said alkylfluoranthene is a mixture of isomers.

4. The composition of claim 2, wherein said alkylpyrene is a mixture of isomers.

5. The resin composition of claim 1, wherein said resin is selected from the group consisting of polyvinyl chloride, vinyl chloride-vinyl acetate copolymer, vinyl chloride-vinylidene chloride copolymer, vinyl chloride-ethylene copolymer, polyethylene, polypropylene, polybutene, ethylene-vinyl acetate copolymer, ethylene-ethyl acrylate copolymer, ethylene-propylene copolymer, ethylene-propylene-diene copolymer, ethylene-vinyl acetate-grafted vinyl chloride copolymer, ethylene-ethyl acrylate grafted vinyl chloride copolymer, ethylene-propylene-grafted vinyl chloride copolymer, chlorinated polyethylene, chlorinated polyethylene-grafted vinyl chloride copolymer, polyurethane, ployamine, polyester, acrylic resin, butyl rubber, chloroprene rubber, nitrile rubber, natural rubber, silicone rubber, chlorosulfonated polyethylene, styrene-butadiene rubber, styrene-butadiene-acrylonitrile copolymer, acrylonitrile-styrene copolymer, polyester-ether elastomer, polyvinyl acetate, polyacrylic acid ester, chloroprene copolymer, furfuryl alcoholic resin, polyvinyl butyral, polyvinyl formal, phenol resin, epoxy resin and melamine resin.

6. A method of stabilizing a polymeric composition against radioactivity consisting of adding to the composition a stabilizing amount of an alkyl-substituted condensed tetracyclic compound of the generic formula:

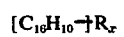

wherein, R denotes an alkyl group having one to four carbon atoms and x is an integer from 1 to 4, and when x is 2 or more, R may be the same or different.

7. The method of claim 6 wherein said alkyl-substituted condensed tetracyclic compound is selected from the group consisting of alkylfluoranthenes of the formula,

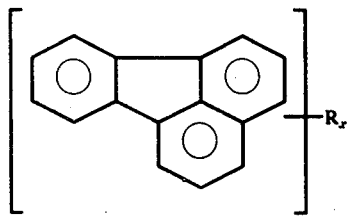

and alkylpyrenes of the formula,

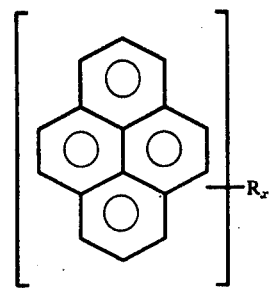

wherein, R denotes an alkyl group having one to four carbon atoms and x is an integer from 1 to 4, and when x is 2 or more, R may be the same or different.

* * * * *